March 13, 1962

M. L. HEINTZ 3,024,731

ARRANGEMENT FOR ADJUSTING THE
DISPLACEMENT OF A PISTON

Filed Aug. 3, 1960

Inventor:
Milton L. Heintz,
by William Friedman
Attorney.

United States Patent Office 3,024,731
Patented Mar. 13, 1962

3,024,731
ARRANGEMENT FOR ADJUSTING THE DISPLACEMENT OF A PISTON
Milton L. Heintz, Newton Square, Pa., assignor to General Electric Company, a corporation of New York
Filed Aug. 3, 1960, Ser. No. 47,307
7 Claims. (Cl. 103—37)

This invention relates to an arrangement for adjusting the displacement of a piston within its surrounding cylinder.

In certain devices that utilize piston-type pumps, it is necessary that some provision be made for adjusting the amount of fluid displaced from the cylinder of the pump by each stroke of the pump piston. Frequently it is desirable that this adjustment be made while the piston is assembled within its cylinder and be made from locations where space and accessibility are highly restricted.

Accordingly, an object of my invention is to provide, for adjusting the displacement of a piston, simple and inexpensive adjusting means that can be readily adjusted from a location of restricted space and accessibility while the piston is still assembled within its cylinder.

Another object is to provide adjusting means of the above nature which can be readily adjusted and readjusted without damaging the piston or the fit between the piston and its surrounding cylinder.

In carrying out my invention in one form, I provide a cylinder in which a piston is mounted for sliding motion. The piston comprises a hollow shell having an internally threaded bore and a cylindrical core disposed within said bore. The core has an externally threaded portion that meshes with the internally threaded bore of the shell, and this meshing relationship serves to vary the longitudinal position of the shell with respect to the core when the shell is rotated on the core. The core has a diametrically extending slot at the longitudinally outer end of the piston for receiving a connecting rod that is utilized to transmit motion to the piston. The tubular shell has a series of circumferentially spaced radially-deformable fingers at its outer end normally extending in a direction longitudinally of the piston. At least one of these fingers is deformed radially inward into the slot to prevent rotation of the shell relative to the core while the finger is disposed in said slot.

For a better understanding of my invention, reference may be had to the following description taken in conjunction with the accompanying drawing, wherein.

Figure 1:
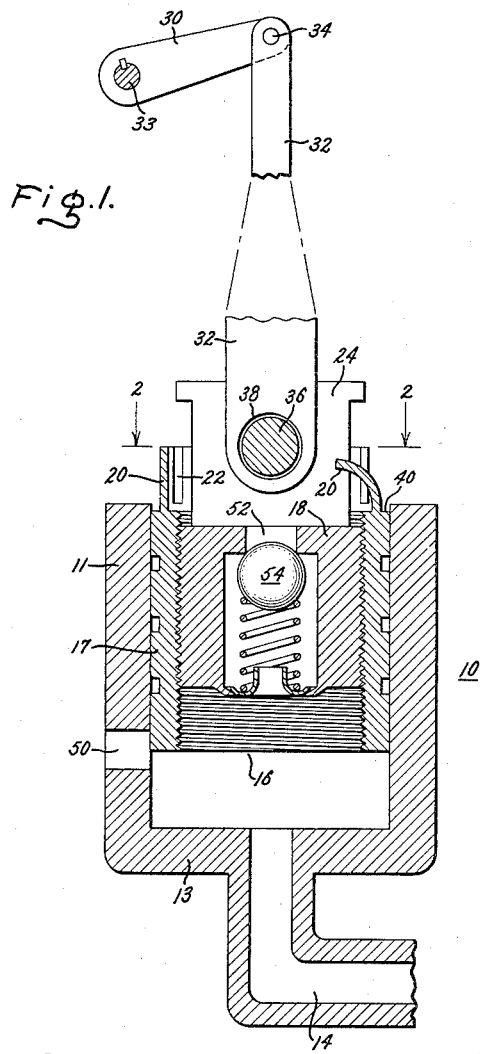
FIG. 1 is a cross-sectional view of a pump embodying one form of my invention.
Figure 2:
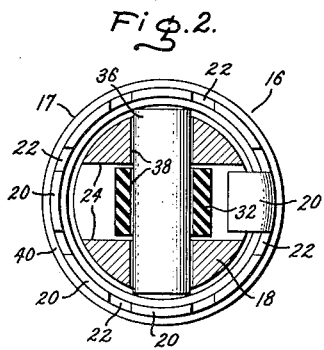
FIG. 2 is a cross-sectional view taken along the line 2—2 of FIG. 1.

Referring now to FIG. 1, there is shown a pump 10 that comprises a cylinder 11 that is normally submerged in a liquid, such as oil. This cylinder 11 has an end wall 13 and an exhaust passage 14 leading from the interior of the cylinder through the end wall 13.

Disposed within the cylinder 11 is a reciprocable piston 16 that is movable in a downward direction from its position of FIG. 1 to force liquid within the cylinder 11 out through the exhaust passage 14. This piston 16 comprises a tubular shell 17 containing an internally threaded bore in which an externally threaded core 18 is disposed. The external threads of the core 18 and the internal threads of the shell 17 mesh with each other and serve to vary the axial position of the shell 17 relative to the core 18 when the shell is rotated on the core.

For locking the shell 17 of the piston in a preselected position on the core 18, the shell is provided with a series of circumferentially spaced fingers 20 extending longitudinally of the piston at its outer end. These fingers 20 are formed by providing the shell with a series of slots 22 extending in a longitudinal direction from the outermost end of the shell in approximately equally-spaced relationship about the circumferential of the shell. The fingers 20 are sufficiently thin to enable them to be deformed in a radial direction to provide the desired locking action, as will soon appear more clearly.

Cooperating with the fingers 20 to provide the desired locking action for the shell is a diametrically extending slot 24 provided in the outer end of the core 18. This slot 24 has a thickness only slightly greater than the width of the widest finger 20 measured in a direction circumferential of the shell 17. When the shell 17 has been rotated on the core 18 into a desired position of adjustment, the one finger 20 that then registers with the slot 24 is displaced radially inward into the slot 24 to lock the shell against movement relative to the core in this preselected position.

For transmitting reciprocating motion to the piston 16, a crank and a connecting rod 32 are provided. The crank 30 is fixed to an oscillatable operating shaft 33 and has its outer end pivotally connected to one end of the connecting rod 32 by means of a suitable crank pin 34. The connecting rod 32 is pivotally connected at its other end to the piston 16 by means of a wrist pin 36 extending through registering apertures 38 provided in the core 18 and the connecting rod 32. The apertures 38 through the core 18 extend in a direction normal to the slot 24 in the core. The presence of the slot 24 enables the connecting rod 32 to pivot to a limited extent on the wrist pin 36 without interference from the surrounding material of the core. The wrist pin 36 is prevented from slipping out of the apertures 38 in the core and the connecting rod by the presence of the fingers 20 surrounding the portion of the core 18 that contains the wrist pin.

It is to be noted that the diametrically-extending slot 24 in the core 18 serves the dual purpose of receiving the connecting rod 32 with appropriate clearance for pivotal motion and of receiving the deformable locking fingers 20 on the shell 17 to lock the shell in a preselected position on the core. Any one of the locking fingers 20 can be deformed into the slot 24 simply by tapping the finger in a radially-inward direction with a hammer and a screwdriver, or similar flat-bladed tool, for imparting force to the finger. To release the finger 20 from the slot 24, the flat blade of the screwdriver can be fitted into the slot 24 at an appropriate angle and the screwdriver tapped with a hammer to force the finger 20 radially outward into its original position. Additional adjustments of the shell 17 relative to the core 18 can then be made, after which the finger then aligned with the slot 24 can be tapped into the slot to lock the shell and core together in this new position of adjustment. Displacing the fingers 20 into and out their locking position does not damage or otherwise significantly impair the shell 17 of the piston.

These adjustments of the shell 17 on its core 18 can be made while the piston is still assembled within its cylinder 11 since the fingers 20 are positioned well above the top of the cylinder 11 when the piston is in its uppermost position of FIG. 1. Thus, all of the parts relied upon for this adjustment are readily accessible without interference from the cylinder 11.

It is to be further noted that the cylindrical portion of the shell 17 from which fingers 20 are formed is a reduced external diameter in comparison to the maximum external diameter of the shell, as is evidenced by the shoulder 40 between these two portions of the shell. Thus, if one of the fingers, after being released from the slot 24, is not returned to precisely its original position, it can still be spaced a slight distance radially inward from the bore of the cylinder 11 and will not score this bore when the piston moves through its operating stroke.

In one application of the present invention, the pump 10 is used for delivering a predetermined quantity of oil through the passageway 14 each time the shaft 33 is driven through a predetermined stroke. Varying the position of the shell 17 on its core 18 can be utilized for varying the amount of liquid displaced by the piston each time it moves through its fixed length downward stroke. In this latter regard, note that the wall of cylinder 11 contains a bypass port 50 adjacent the uppermost position of the piston. If the shell 17 is adjusted so that it initially covers this port 50, then the total stroke of the piston will be used for delivering oil or liquid through the passageway 14. If the shell 17 is initially positioned sufficiently high to uncover the port 50 or a portion of the port, then the initial portion of its downward stroke will force liquid through the port 50 rather than passageway 14, and thus a lesser amount of liquid will be forced through the passage 14 for the same total stroke of the piston. The amount of liquid forced through the passage 14 by the piston during a single stroke may be thought of as the effective displacement of the piston. Since the port 50 causes the effective displacement of the piston to be varied when the position of the piston shell 17 on the core 18 is changed, the port 50 may be thought of as constituting means dependent upon the longitudinal position of the shell with respect to the core for controlling the effective displacement of the piston.

For replenishing the supply of liquid beneath the piston after each downward stroke, a passageway 52 is provided through the core 18 of the piston. This passageway contains a spring-loaded check valve 54 which allows liquid to flow only in a downward direction through the passageway 52. When the piston is moved downwardly, no liquid flows through the passageway 52, but when the piston is returned to its uppermost position of FIG. 1, liquid flows through the passageway 52 past the check valve 54 into the space beneath the piston.

Figure 3:
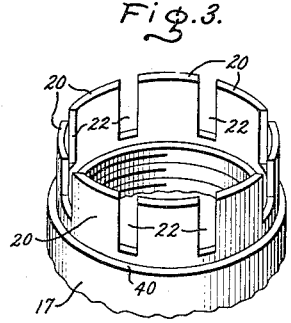
FIG. 3 is a perspective view of a portion of the pump shown in FIG. 1.

It is to be understood that downward motion of the piston 16 is produced by rotating the operating shaft 33 in a clockwise direction through a predetermined stroke, and that upward motion of the piston is produced by returning the shaft 33 in a counterclockwise direction to its initial position illustrated in FIG. 3. The length of this stroke is such that the piston does not encounter the end wall 13 of the cylinder 11.

While I have shown and described a particular embodiment of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. In combination, a cylinder, a piston mounted for slidable movement within said cylinder, said piston comprising a hollow shell having a bore and a cylindrical core disposed within said bore, meshing threads provided on said bore and the exterior of said core for varying the longitudinal position of said shell with respect to said core when said shell is rotated relative to said core, said core having a generally diametrically-extending slot provided in its longitudinally outer end for receiving a connecting rod for transmitting motion to said piston, said hollow shell having a series of circumferentially spaced radially-deformable fingers at its outer end normally extending in a direction longitudinal of said piston, at least one of said fingers being deformed radially inward into said slot to prevent rotation of said shell relative to said core while said finger remains in said slot.

2. In combination, a cylinder, a piston mounted for slidable movement within said cylinder, said piston comprising a hollow shell having an internally threaded bore and a cylindrical core disposed within said bore and having an externally threaded portion meshing with said internally threaded bore, the meshing relationship of said threaded portions serving to shift said shell longitudinally of said core when said shell is rotated on said core, said core having a generally diametrically-extending slot provided in its longitudinally outer end for receiving a connecting rod for transmitting motion to said piston, said hollow shell having a reduced diameter portion at its outer end containing a series of slots extending in a direction longitudinal of said piston to define between adjacent slots radially-deformable fingers, at least one of said fingers being deformed radially inward into said slot to prevent rotation of said shell relative to said core while said finger remains in said slot.

3. The combination of claim 1 in which each of said fingers has a width measured circumferentially of said shell slightly less than the width of said slot.

4. The combination of claim 1 in which said piston has a normal position wherein said fingers and said slot are disposed outside of said cylinder whereby said fingers are accessible for displacement into and out of said slot.

5. In combination, a cylinder, a piston mounted for slidable movement within said cylinder, said piston comprising a hollow shell having a bore and a cylindrical core disposed within said bore, meshing threads provided on said core and said bore for varying the longitudinal position of said shell with respect to said core when said shell is rotated relative to said core, said core having a diametrically extending slot at the outer end of said piston, a connecting rod having a portion disposed within said slot, said core and said connecting rod having registering apertures therein extending in a direction transverse to said slot, a wrist pin disposed within said apertures and coupling said core and connecting rod together, said hollow shell including a cylindrical portion at its outer end containing a series of slots extending in a direction longitudinal of said shell to define between adjacent slots radially deformable fingers, at least one of said fingers being deformed radially inward into said slot to prevent rotation of said shell relative to said core while said finger remains in said slot, others of said fingers being disposed at least partially in alignment with said apertures for capturing said pin in said apertures.

6. The apparatus of claim 1 in combination with means dependent on the longitudinal position of said shell with respect to said core for controlling the effective displacement of said piston during motion of said piston through a stroke of a predetermined length.

7. The apparatus of claim 5 in combination with means dependent on the longitudinal position of said shell with respect to said core for controlling the effective displacement of said piston during motion of said piston through a stroke of a predetermined length.

References Cited in the file of this patent

UNITED STATES PATENTS

| | | |
|---|---|---|
| 2,461,873 | Beeh | Feb. 15, 1949 |
| 2,647,683 | Schweller | Aug. 4, 1953 |
| 2,729,388 | Ringham | Jan. 3, 1956 |
| 2,926,228 | Date et al. | Feb. 23, 1960 |